Sept. 15, 1964  L. L. HIGGINS  3,148,541
FLUID VELOCITY DETECTION ARRANGEMENT
Filed Feb. 1, 1961

LARRY L. HIGGINS
INVENTOR.

BY George C. Thompson
  agent

United States Patent Office 3,148,541
Patented Sept. 15, 1964

3,148,541
FLUID VELOCITY DETECTION ARRANGEMENT
Larry L. Higgins, Woodland Hills, Calif., assignor to Space Technology Laboratories, Inc., Los Angeles, Calif., a corporation of Delaware
Filed Feb. 1, 1961, Ser. No. 86,393
8 Claims. (Cl. 73—194)

This invention relates to an arrangement for detecting velocity information of a fluid body and, more particularly, to an improved arrangement for detecting turbulence and other velocity variations within fluids.

In dynamic systems it is often necessary to detect fluctuating velocities within a liquid. Prior art apparatus for accomplishing this detection have a detecting element which is introduced into the flowing fluid. The velocities of the fluid are measured by changes of the element charactericstics. Accurate velocity or turbulence measurement requires an element that does not disturb the fluid flow pattern, and that is small compared to the dimensions of any turbulence. Moreover, the element should have low inertia to indicate rapid velocity changes and should be sensitive to very small percent changes. On the other hand, the element should be stable in terms of calibration and sturdy enough to exclude vibrations caused by the fluid flow.

Some of the known fluid velocity measuring devices include fragile and easily contaminated hot-wire resistance devices, high inertia pitot tubes, and relatively insensitive electromagnetic induction arrangements. In low heat capacity fluids such as certain gases, a hot-wire resistance anemometer will detect turbulence with useful sensitivity, but in liquid environments the necessity of having a more rigid construction results in reduced sensitivity and the maintaining of a sufficiently high temperature for sensitive detection purposes has proved difficult. Hot-wire resistance anemometers, because of their very hot temperatures, cause greatly accelerated contamination of the detecting member and thus a rapid loss of calibration of the instrument. In some cases, dust particles or foreign matter particles capable of being carbonized by the hot temperature are substantial contaminants due to the respective foreign matter particle and hot wire sizes. The high inertia pitot tubes tend to modify substantially high frequency disturbances. The usual electromagnetic induction arrangements have comparable limitations because of their large size.

Therefore, an object of the present invention is to provide a rugged and sensitive fluid velocity measuring arrangement for detecting turbulence and providing an essentially instantaneous signal indication.

It is a further object of the present invention to provide an improved fluid velocity measurement apparatus for more accurate detection and measurement of fluid velocity without substantial disturbance or modification of the same.

According to one embodiment of the present invention, a conical probe develops at its leading tip an electric field in a contiguous fluid of finite conductivity. The electric field induces current flow in the fluid which heats the fluid in accordance with the heating losses measured in joules. The average temperature of the fluid is raised as a positive function of these losses and the duration of the heating. Thus the fluid is heated in accordance with its rate of flow past the tip. Since the conductivity of a fluid depends on its temperature, it is conductive in accordance with its rate of flow. The probe tip of the present invention is energized from a high frequency source, and is coupled as a portion of a bridge circuit to develop a signal across an output element of the bridge. This signal is modified in accordance with small variations of temperature of the fluid as a function of the flow rate of the fluid through the electric field in the region of the tip.

Although the invention is described in connection with a liquid and the frequencies most suited therefor, it is pointed out that the fluid need not be restricted to a liquid, but may be any energy absorbing fluid. Further, the energizing frequencies are selected to be in a spectrum capable of being sufficiently absorbed to provide for the necessary fluid heating activity.

The subject matter which is regarded as this invention is particularly pointed out and distinctly claimed in the concluding portion of the specification. The invention, however, as to its organization and operation, together with further objects and advantages thereof, will best be understood by reference to the following description taken in connection with the accompanying drawing in which:

Figure 1:
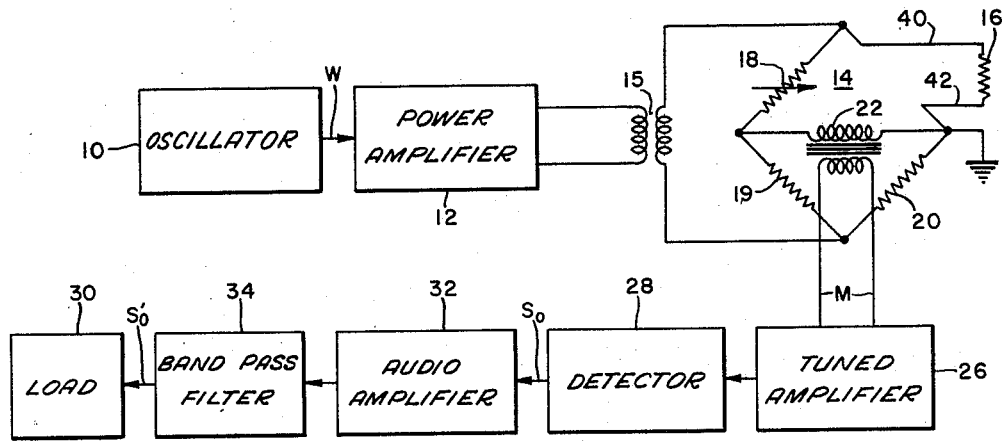
FIGURE 1 illustrates a block diagram of a circuit arrangement suitable for use with the present invention.

Referring now to the drawing, wherein like numbers indicate identical parts, there is shown in FIG. 1 an oscillator 10 developing a high frequency carrier wave W which is coupled to a power amplifier 12, the output of which is applied to a bridge circuit 14 through an impedance matching coupling transformer 15. One leg of the bridge circuit 14 includes a sensing or control member in the form of a resistance probe 16 of the present invention illustrated schematically as a simple resistor. Another leg of the bridge circuit 14 contains a balancing resistor 18, with the other two legs containing matched impedances 19 and 20.

Across the bridge circuit 14 is coupled an output transformer 22 arranged to conduct a current in accordance with any imbalance between the resistance probe 16 and the balancing resistor 18. The frequency of the imbalance signal M from the output transformer 22 is equal to the frequency of the oscillator 10, and its amplitude is modulated as a function of the instantaneous imbalance of the bridge circuit. By way of example: the carrier wave W applied to the bridge circuit 14 may have a frequency of 40 kc. and an R.M.S. voltage of one volt; the imbalance signal M may have an R.M.S voltage of one millivolt, with amplitude modulation of the order of one microvolt.

The imbalance signal M is applied to a tuned amplifier 26, of the type exemplified by I.F. amplifiers in the radio art, and from the same to an amplitude modulation detector 28, to provide the envelope signal $S_o$ indicative of the fluid velocity variations. The velocity signal $S_o$, after appropriate filtering, is coupled to recording and measuring load equipment 30 suitable for the particular application. The tuned amplifier 26 is tuned to the frequency of the carrier wave W. Usually it is preferable to amplify the demodulated output signal with an intermediate audio amlifier 32. A filter 34 is coupled between the detector 28 and the load equipment 30 to pass the band of frequencies, such as 50–2000 c.p.s., which are of interest to the particular investigation. The frequency (40 kc.) of the oscillator 10 is selected to be substantially higher than the highest frequency of the band pass of the filter 34 and higher than any detectable fluid velocity variations in the vicinity of the resistance probe 16. A resulting output signal $S'_o$ indicates turbulence in the liquid of frequencies of 50–2000 c.p.s.

Figure 2:
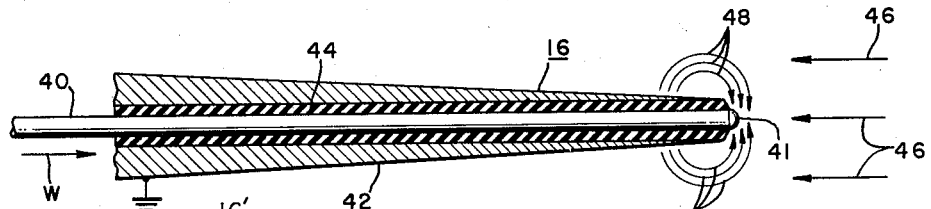
FIG. 2 is a plan view, partially broken away, of one embodiment of the probe illustrated in FIG. 1.

Referring now to FIG. 2, there is shown an enlarged view of one embodiment of the resistance probe 16. The high frequency carrier wave W is applied to a central lead wire or conductor 40 passing through the resistance probe 16 to an exposed forward portion thereof, such as the leading tip 41. This lead wire 40 is insulated from a grounded conductor, which is shown as an outer support sleeve 42, by dielectric material 44 substantially preventing electrical coupling therebetween throughout the length of the probe. In accordance with the present invention, the only electric field coupling represented by the arrows 48 between the lead wire 40 and the sleeve 42 is through the fluid medium 46 surrounding the forward tip 41 of the resistance probe 16. Most fluids, such as tap water or sea water, are electrically conductive as a positive function of their temperature. Typically, the electrical resistance of an electrolytic solution changes 2 percent per degree centigrade. Also the fluid will be heated as a positive function of its residence time within the electric field represented by the arrows 48. As the conductivity of the fluid in the region of the tip 41 changes because of velocity variations, the impedance of the resistance probe 16 changes. These impedance changes modulate the signal M across the output transformer 22.

By providing a relatively high voltage signal across the bridge circuit 14, substantial currents are forced through the fluid medium 46 by the electric field represented by the arrows 48. These currents are selected to be large enough to heat the fluid medium 46 and thereby increase its conductivity. As a result of such increased conductivity, the impedance of fluid at the tip 41 and of the resistance probe 16 is reduced. However, the average effect of the heating is a function of both the current flow rate and the time during which the current is carried by the fluid medium 46. Thus the fluid temperature varies as a function of the instantaneous velocity of the fluid in the region of the tip 41. The hydrodynamic properties of the particular tip illustrated in FIG. 2 are designed to provide a minimum disturbance of the flowing fluid medium 46 whereby the variation of the conductivity of the fluid medium 46 is primarily responsive to turbulence of the fluid medium. The resistance probe 16 is preferably of a small outer diameter, such as a millimeter. Moreover, by making the spacing in the region of the tip 41 so that the fluid conducting distance between the lead wire 40 and the outer sleeve 42 is very small, the resistance probe 16 will sense high frequency fluid turbulence vibrations. However, the construction illustrated is rugged compared to a comparable hot-wire anemometer. Furthermore, the present invention has extremely rapid response compared to a hot-wire arrangement because the current carrying member (the fluid) is continuously being replaced. The response depends only upon the physical size of the electrode. On the other hand, the heat capacity of a hot-wire element results in less than instantaneous cooling of the wire. This heat capacity is particularly troublesome when the hot-wire must be of a large cross-section to withstand fluid flow forces.

The operation of the fluid velocity detector or sensor may be better understood by considering the following analysis.

The temperature increase, $\Delta T$, of water passing over an electrode which is delivering a power, P, to the sea water is $$\Delta T = \frac{nP}{ca^2 U}$$

where $c$ is the heat capacity per unit volume, $a$ is the typical electrode dimension, $n$ is a number of the order of unity which is characteristic of the particular electrode geometry, and $U$ is the velocity of the fluid 46 relative to the probe 16 in the region encompassed by the electric field 48. The temperature rise varies inversely with velocity. A small difference $\delta R$ in resistance between the electrodes 40 and 42, is related to the corresponding difference in velocity, $\delta U$, between the electrodes simply by $$\left(\frac{\delta R}{R}\right) = \beta \delta \Delta T$$

$$\delta \Delta T = -\Delta T \left(\frac{\delta U}{U}\right)$$

and $$\left(\frac{\delta R}{R}\right) = -\frac{1}{2} \beta \Delta T \left(\frac{\delta U}{U}\right)$$

where $\beta$ is the temperature coefficient of water (2% per degree C.). The factor 1/2 accounts for the mean temperature rise over the electrode region. The combination $1/2 \beta \Delta T$ is the "velocity sensitivity factor" of the detector. The sensitivity to velocity microstructure increases as the temperature, $\Delta T$, increases.

A numerical example serves to show the potential of this type of velocity detector. Present equipment with a 1000 c.p.s. bandwidth has a bridge sensitivity of the order of $$\left(\frac{\delta R}{R}\right) = 4 \times 10^{-7}$$

A small electrode of the order of 1 mm. in diameter operating at 10 watts input power in a stream of water moving at 5 knots, heats the water passing over the electrode about 1° C. A small probe is desirable for two reasons: (1) the temperature rise is greater; and (2) a small probe is desirable for water tunnel measurements. From the above expression, it may be seen that turbulence levels of the order of .002%, i.e., $$\left(\frac{\delta U}{U}\right) \approx 2 \times 10^{-5}$$

would be detectable. This extreme sensitivity coupled with the rapid response time and desirable properties of a relatively cool "hot" electrode probe, indicates the value of the turbulence detector in comparison with present state-of-the-art detectors.

A factor yet to be considered, however, is the variation of the heat capacity in the water. Actually, the detector responds to the variation in (heat capacity times velocity). If the heat capacity per unit mass is constant, the detector measures the product (density times velocity) or the momentum microstructure in the water rather than just the velocity microstructure. If the water is thoroughly mixed to remove concentration gradients, it responds only to velocity variations. Temperature microstructure in the water presents a limitation to the sensitivity of this type of fluid velocity detector.

Figure 3:
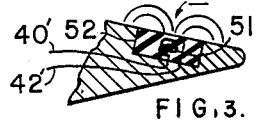
FIG. 3 is a plan view, partially broken away, of another embodiment of the probe.

The probe of FIG. 3 is provided with a single coil or winding 51 positioned close to the surface of an insulating support member 52, which is shown as an insert in the probe 16' but which may actually comprise the entire probe 16' body. The coil 51 establishes a field in the passing fluid for heating purposes when energized through the conductors 40' and 42' as described hereinbefore. The probe 16' and in-leads 40' and 42' of FIG. 3 are, of course, functionally similar to the corresponding elements 16, 40, and 42 of FIGS. 1 and 2.

In summary, the above-described invention is a fluid velocity detection arrangement having an element which, although it will not disturb the surrounding flow pattern and will sensitively detect high frequency turbulence, is rugged and easy to maintain. The element will detect turbulent velocities of .001 percent of the main stream velocities with a structure that is both smaller and more rugged than presently available equipment.

While I have shown and described particular embodiments of the present invention, other modifications will occur to those skilled in the art. For instance, the resistance probe can be provided with a platinum coating to reduce oxidation or contamination. Moreover, the region of the electric field represented by the arrows 48 can be substantially removed from the leading edge of the probe whereby the leading edge can be of stainless steel or some other rugged material. I intend therefore by the appended claims to cover all such modifications as come within the true spirit and scope of the present invention.

The embodiments of the invention in which an exclusive property or privilege is claimed are defined as follows:

1. A velocity detection arrangement for use in a fluid medium having a finite electric conductivity which varies as a function of temperature, comprising:

a sensing member having an elongated body and a tapered end portion with said end portion including two electrically conductive surfaces engaging the fluid medium;

power means for generating an electric field between said two surfaces whereby the fluid medium forms a coupling therebetween;

means for causing said fluid medium to flow continuously through the region occupied by said field;

said power means being arranged to provide sufficient energy to the two surfaces to heat the fluid medium at an appreciable rate whereby the temperature of the fluid medium is increased as it flows through said region;

and means for determining the coupling between the two surfaces.

2. A velocity detection arrangement for use in a fluid medium having a finite electric conductivity which varies as a function of temperature, comprising: a sensing member having an elongated body and a tapered end portion having two adjacent electrically conductive surfaces carried by said end portion and engaging the fluid medium, carrier wave power means coupled to said sensing member for producing a high frequency alternating electric field between said two surfaces, said power means being arranged to provide sufficient electrical energy to the two surfaces to develop a substantial electrical current flow therebetween to heat the fluid medium at an appreciable rate whereby the temperature of the fluid medium is increased to an extent dependent upon the fluid velocity as it flows through the region of the two surfaces; an amplitude demodulation circuit coupled to said sensing member for developing an output signal proportional to the temperature dependent conductivity of the fluid medium; and a load means coupled to said demodulation circuit to indicate the turbulence of the fluid medium.

3. A velocity detection arrangement for use in a fluid medium having a finite electric conductivity which varies as a function of temperature, comprising:

a resistance probe having an elongated body and a tapered end portion adapted to point in a direction substantially opposite the direction of fluid flow, with said end portion including two electrically conductive surfaces disposed substantially flush with the surface of said tapered end portion and arranged to engage the fluid medium;

lead wires connected with each of said two surfaces and being electrically insulated internally of said probe;

electric power means coupled to said probe for generating a high frequency alternating electric field between said two surfaces whereby the fluid medium forms a power dissipative coupling therebetween;

said power means being arranged to apply sufficient electrical energy to said fluid medium for heating the fluid medium at an appreciable rate so that the temperature of the fluid medium is increased as a function of its rate of flow through the region of the two surfaces;

and electric circuit means for determining the temperature dependent conductivity of the fluid coupling between the two surfaces and producing fluid velocity indicative output signals.

4. A velocity detection arrangement for use in a fluid medium having a finite electric conductivity which varies as a function of temperature, comprising: a resistance probe having an elongated body and a tapered end portion having two electrically conductive surfaces arranged to engage the fluid medium; carrier wave generating electric power means coupled across said surfaces for generating a high frequency alternating electric field between said surfaces and resistively dissipating electric energy in the fluid medium therebetween; said power means being arranged to provide sufficient electric energy to heat the conducting fluid medium at an appreciable rate so that the fluid temperature is increased inversely as the fluid velocity; circuit means responsive to the temperature dependent conductivity of the fluid in the region of said electric field to develop an amplitude modulated carrier wave signal; an amplifier receptive of said modulated signal; and amplitude demodulation circuit means coupled to receive the output of said amplifier for producing output signals indicative of the turbulence of the fluid medium passing through the region of said electric field.

5. A velocity detection arrangement for use in a fluid medium having at least a finite electric conductivity which varies as a function of temperature, comprising:

an elongated probe having a tapered end portion with said end portion including two separate conductive surfaces disposed substantially flush with said tapered end portion and adapted to be immersed in a fluid medium for establishing an electric field in said fluid medium adjacent said tapered end portion in a region where the fluid velocity is substantially unaffected by the presence of said probe;

power means coupled to said probe for dissipating sufficient energy in fluid traversing said field to heat the fluid medium at a rate causing a measurable change in the temperature dependent conductivity of said fluid medium;

and means coupled to said probe for measuring said change in conductivity and providing fluid velocity indicative output signals.

6. In a fluid velocity measuring apparatus including a probe having an elongated body portion and a tapered end portion arranged to be immersed in a fluid with said end portion positioned to point in a direction generally parallel to the direction of flow of the fluid;

sensing means, including first and second electrically conductive surfaces disposed substantially flush with the surface of said tapered end portion, for producing an intersurface electric field adjacent said tapered end portion in a region where the velocity of said fluid is substantially unaffected by the presence of said probe;

electrical energy supplying means coupled to said surfaces for dissipating electrical energy in the fluid traversing said region whereby said fluid is heated inversely as the fluid velocity; and circuit means responsive to the impedance of the fluid in said region for producing a fluid velocity indicative electrical signal.

7. In combination:

a probe having an elongated body portion and a tapered end portion arranged to be immersed in a fluid with said end portion pointed in a direction generally parallel to the direction of flow of the fluid;

sensing means, including first and second electrically independent conductive surfaces disposed substantially flush with the surface of said tapered end portion, for producing an electric field adjacent said end portion in a region where the velocity of said fluid is approximately independent of the presence of said probe;

electrical energy supplying means coupled to said surfaces for dissipating electrical energy in the fluid traversing said region whereby said fluid is increased in temperature in inverse proportion to the fluid velocity; and circuit means responsive to the temperature dependent conductivity of the fluid in said region for producing a fluid velocity indicative electrical signal.

8. In combination:
an elongated probe having a tapered end portion arranged to be immersed in a fluid and pointed in a direction substantially parallel to the fluid flow direction;
first and second electrically individual conductive elements carried by said end portion for producing an electric field in a region adjacent said end portion where the fluid velocity is minimally affected by the presence of said probe;
power means coupled to apply voltage between said elements for inducing dissipation of electric energy in fluid traversing said region and for consequently heating said fluid to an extent dependent upon the fluid velocity; and
means instantaneously responsive to the temperature dependent conductivity of the fluid within said region for producing a fluid velocity indicative output signal.

References Cited in the file of this patent

UNITED STATES PATENTS

| | | |
|---|---|---|
| 1,411,796 | Meyer | Apr. 4, 1922 |
| 1,611,502 | Allen | Dec. 21, 1926 |
| 2,435,043 | Lehde et al. | Jan. 21, 1948 |
| 2,650,496 | Middleton et al. | Sept. 1, 1953 |
| 2,761,320 | Duntley | Sept. 4, 1956 |
| 2,764,892 | Rosenthal | Oct. 2, 1956 |
| 2,870,305 | Sung-Ching Ling | Jan. 20, 1959 |
| 3,008,666 | Kuck | Nov. 14, 1961 |
| 3,040,571 | Kolin | June 26, 1962 |
| 3,056,295 | Lanb | Oct. 2, 1962 |
| 3,068,693 | Ferran et al. | Dec. 18, 1962 |
| 3,075,515 | Richards | Jan. 29, 1963 |

FOREIGN PATENTS

| | | |
|---|---|---|
| 916,592 | Germany | Aug. 12, 1954 |